United States Patent [19]
Nobuyuki et al.

[11] Patent Number: 5,939,108
[45] Date of Patent: Aug. 17, 1999

[54] BLOW AIR CYLINDER FOR BLOW-MOLDING HOLLOW CONTAINER

[75] Inventors: Takakusaki Nobuyuki; Terajima Yoshimi, both of Kanagawa-ken; Takeda Isamu, Tokyo, all of Japan

[73] Assignee: Toyo Seikan Kaisya, Ltd., Tokyo, Japan

[21] Appl. No.: 08/953,378

[22] Filed: Oct. 17, 1997

Related U.S. Application Data

[62] Division of application No. 08/676,505, Jul. 8, 1996, Pat. No. 5,759,475, which is a continuation of application No. 08/244,901, filed as application No. PCT/JP92/01386, Oct. 26, 1992, abandoned.

[51] Int. Cl.$^6$ .......................... B29C 49/60; B29C 49/64
[52] U.S. Cl. ............................... 425/526; 425/536
[58] Field of Search ..................... 425/526, 536

[56] References Cited

U.S. PATENT DOCUMENTS

| | | | |
|---|---|---|---|
| 3,338,998 | 8/1967 | Di Settembrini | 425/536 |
| 3,450,805 | 6/1969 | Chesser | 425/526 |
| 3,457,590 | 7/1969 | Dittman | 264/540 |
| 3,500,497 | 3/1970 | Culpepper | 425/535 |
| 3,505,442 | 4/1970 | Culpepper | 264/520 |
| 3,538,211 | 11/1970 | Adomaitis | 425/536 |
| 3,571,848 | 3/1971 | Szajna | 425/536 |
| 3,592,886 | 7/1971 | Havely | 264/520 |
| 3,661,483 | 5/1972 | Bose | 425/526 |
| 3,932,084 | 1/1976 | Reilly | 425/182 |
| 5,052,626 | 10/1991 | Wood et al. | 239/567 |
| 5,078,948 | 1/1992 | Troutman et al. | 425/536 |
| 5,565,165 | 10/1996 | Matsuhashi | 264/526 |

FOREIGN PATENT DOCUMENTS

| | | |
|---|---|---|
| 55-118834 | 9/1980 | Japan . |
| 57-45036 | 3/1982 | Japan . |
| 5-69476 | 3/1993 | Japan ...................................... 425/536 |
| 60-120031 | 6/1994 | Japan . |

*Primary Examiner*—Robert Davis
*Attorney, Agent, or Firm*—Armstrong, Westerman, Hattori, McLeland & Naughton

[57] ABSTRACT

A blow molding method by horizontal blow molding of piercing the wall of a parison having been extruded by an extruder with a blow nozzle is disclosed, which comprises moving forward the blow nozzle to pierce the parison, introducing blow air at least in the direction toward the bottom, i.e., opposite to the bottle neck and, after shaping of a hollow container by the blow air, forming an opening in the parison at a position in the vicinity of or above the blow nozzle-pierced portion to discharge the blow air having circulated inside the hollow container. In this blow mollding method, there is preferably used a blow air cylinder, which is constituted by (A) a blow nozzle having a mechanism for registering blowing inlets in at least part of a portion freely sliding forward and backward inside the body, having a tip portion with an outer diameter smaller than at about the center portion thereof and being of a shape of a closed injection needle, and having the blowing inlets located slightly at the back of the tip portion where the outer diameter is larger than that at the tip portion and smaller than that at the central portion and capable of introducing blow air in the direction toward the bottom, i.e., opposite to the bottle neck in an amount of 30% or more of the total blow air amount; and (B) a body provided outside and, at least partly, in contact with the blow nozzle.

5 Claims, 6 Drawing Sheets

BLOW AIR CYLINDER FOR BLOW-MOLDING HOLLOW CONTAINER

This is a divisional of application Ser. No. 08/676,505 filed Jul. 8, 1996 and now U.S. Pat. No. 5,759,475, which is a continuation of application Ser. No. 08/244,901 filed Sept. 14, 1994 and now abandoned, which is a 371 of PCT/JP92/01386 filed Oct. 26, 1992.

TECHNICAL FIELD

This invention relates to a method for blow-molding a hollow container and to a blow air cylinder and, more particularly, to a blow-molding a method which enables one to shorten the time for cooling moldings immediately after being blow-moled. This invention also relates; to producing moldings having good dimensional accuracy. A blow air cylinder is taught which is particularly adapted for the blowing method

PRIOR ART

In molding hollow containers from a thermoplastic resin according to blow molding techniques, it has been well known to pierce the upper portion of a parison having been melt extruded through a die head of an extruder with a blow nozzle for introducing blow air, and blowing a compressed air into the parison through the nozzle to thereby press the parison against the wall of a metal mold for shaping and cooling.

The blow nozzle for use in the blow molding is a member which, upon blow molding, pierces the upper wall of the parison and which functions to introduce a compressed air through a blowing inlet or inlets provided at the tip of the nozzle or in the vicinity thereof, and has a sophisticatedly designed structure.

For example, Japanese Examined Utility Model No. S52-19033 describes the structure of a blow molding nozzle which has a pin with a sharp tip, said pin having a passageway for blowing air formed at its center extending in the direction of the central axis and pores connecting to the passageway almost at a right angle therewith in the vicinity of the tip of the pin and having one or more linear grooves outside between the tip and the pores.

The form of the nozzle tip for blow molding must be so designed as to facilitate piercing of the wall of the parison having been extruded in a heated state with the nozzle and subsequent smooth blowing. The form of the blowing inlets of the above-described utility model, too, has grooved blowing inlets toward the tip from this viewpoint.

Japanese Unexamined Utility Model No. 57-169510 discloses the structure of a blow molding nozzle wherein the tip is of a shape of a closed injection needle with an angular cut of 10 to 45 degrees and which has two air-blowing holes formed on the way to the tip at a right angle with a blow air passageway. In this utility model, too, the nozzle tip has a specific structure which facilitates piercing of the wall of a parison with even a thick nozzle.

In a horizontal blow molding method, a blow nozzle pierces the wall of a parison having been heat-extruded in a metal mold and, after closing the metal mold, compressed air (blow air) is introduced into the parison to completely press the soft-state parison against the inside surface of the metal mold for shaping and cooling, thus one blowing step being completed.

PROBLEMS THAT THE INVENTION IS TO SOLVE

In the (conventional blow molding methods using such known blow nozzles, however, blow air introduced through the blowing inlets fills up the bottle at the time when the soft-state parison is pressed against the wall of the metal mold and, therefore, flow of the blow air is discontinued. Thus, subsequent cooling of the blown bottle is mainly conducted by circulating cooling water in the metal mold in contact with the bottle.

However, this method requires a considerably long time for cooling the shaped bottle still kept at an elevated temperature to such a degree that the metal mold can be opened. Thus, there arises a problem in view of molding efficiency and, in addition, there arises another technical problem that, since the bottle is not uniform in thickness, uniform cooling can not be attained.

That is, there are known no blow nozzles of the structure designed for conducting the step of cooling moldings (bottles) most effectively, though nozzle structures suited for piercing the wall of a parison or for introducing the compressed air have been known.

OBJECTS OF THE INVENTION

An object of the present invention is to provide a process for blow molding hollow containers having no molding deformation and having excellent quality, in which the blow air introduced into the container (bottle) is well circulated therein even after shaping of the bottle to rapidly cool the bottle.

Another object of the present invention is to provide a blow air cylinder adapted for the method.

DISCLOSURE OF THE INVENTION

The present invention is proposed for attaining the above-described objects and relates to a method for blow molding a hollow container using a blow nozzle of a specific structure and to a blow air cylinder containing the nozzle.

That is, according to one aspect of the present invention, there is provided a method for blow molding a hollow container by horizontal blow molding of piercing the wall of a parison having been extruded through a die head of an extruder with a blow nozzle, which comprises introducing blow air at least in the downward direction, i.e., in the direction opposite to the bottle neck, to form an opening.

According to another aspect of the present invention, there is provided a blow molding method, in which a part of a parison in the vicinity of, or above, the blow nozzle-piercing portion is thinned so much, after shaping of the hollow container, that the part is broken to form an opening through which the blow air having circulated inside the hollow container is discharged.

According to a further aspect of the present invention, there is provided a blow molding method, in which the amount of air blown in the direction toward the bottom, i.e., opposite to the bottle neck, is larger than that blown in other directions.

According to a further aspect of the present invention, there is provided a blow molding method, in which blowing inlets are formed in the vertical direction, with the amount of air blown in the direction toward the bottom, i.e., opposite to the bottle neck, being larger.

According to a further aspect of the present invention, there is provided a blow molding method, in which blowing inlets are formed in the vertical and horizontal directions, with the amount of air blown in the direction toward the bottom, i.e., opposite to the bottle neck, being larger than that in each of the other three directions.

According to a still further aspect of the present invention, there is provided a blow air cylinder, which is constituted by (A) a blow nozzle having a mechanism for positioning blowing inlets in at least part of a portion freely sliding forward and backward inside the body, having a tip portion with an outer diameter smaller than at about the center portion thereof and being of a shape of a closed injection needle, and having the blowing inlets located slightly at the back of the tip portion where the outer diameter is larger than that at the tip portion and smaller than that at the central portion and capable of introducing blow air in the direction toward the bottom, i.e., opposite to the bottle neck, in an amount of 30% or more of the total blow air amount; and (B) a body provided outside and, at least partly, in contact with the blow nozzle.

BEST MODE FOR PRACTICING THE INVENTION

Figure 1:
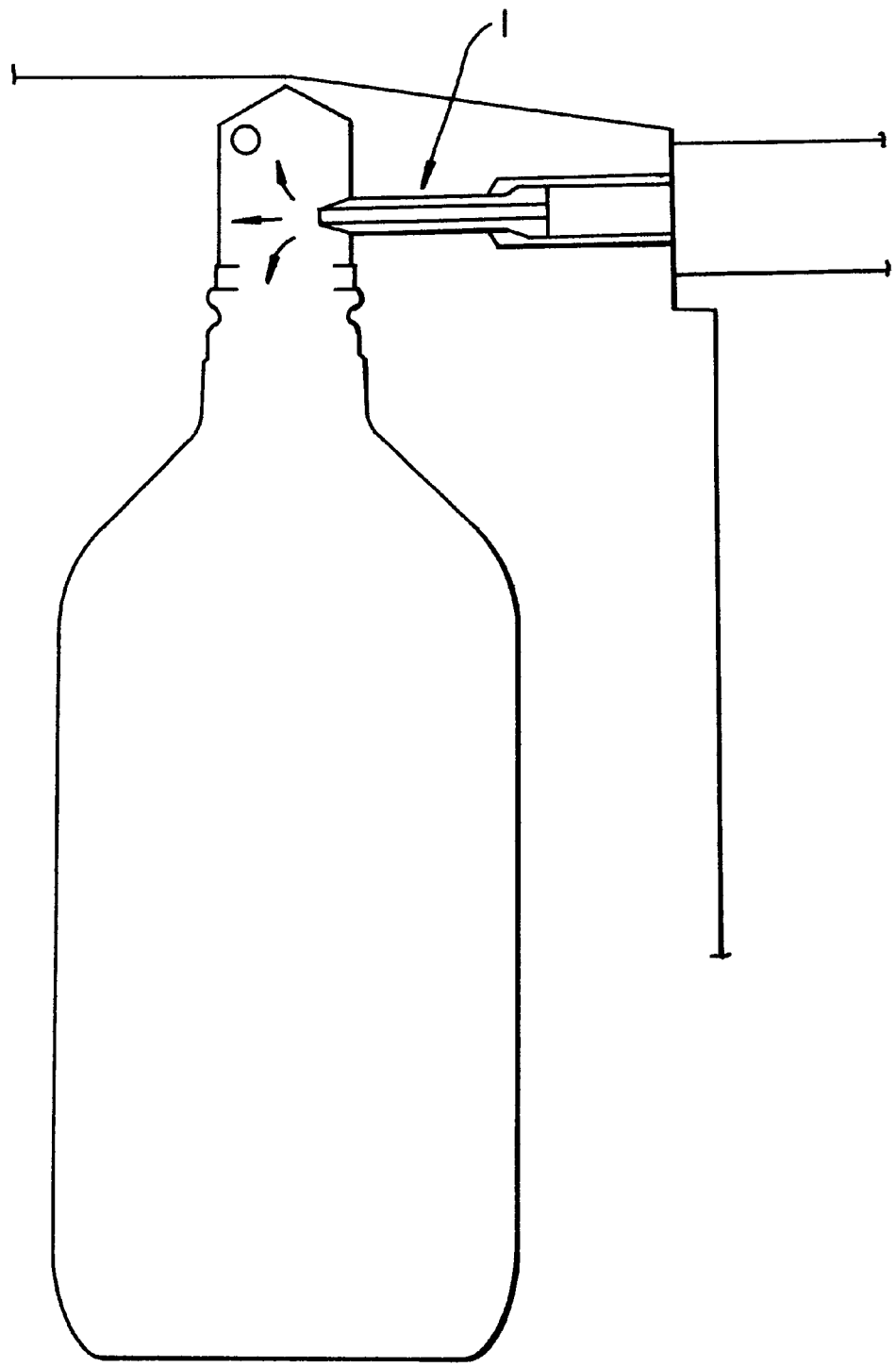
FIG. 1 is a schematic view illustrating the state of a blow nozzle used in the prior art blow molding method.

As is described hereinbefore, a first technical feature of the present invention is to form blowing inlets of the blow nozzle so that the amount of blow air in the downward direction, i.e., in the direction opposite to the bottle neck, be at least 30%, preferably at least 50%, more preferably at least 70%, of the whole blow air amount.

The present invention has been described referring to the case where the parison is held with the bottle neck directed upward. However, it can easily be understood that, where the parison is held with the bottle neck directed downward, the blow air should be introduced in the upward direction.

Another technical feature of the present invention is that, after shaping of a bottle by filling the inside of a metal mold with the blow air, part of the parison in the vicinity of or above the blow nozzle-pierced portion is thinned and broken to form an opening through which blow air having circulated in the interior of the bottle is discharged.

That is, the opening is formed, after shaping of the bottle, by the pressure of the blow air, and this opening serves to adjust discharge of the blow air filling the bottle. Hence, the blow air does not stagnate in the metal mold after shaping of the bottle but circulates within the bottle to rapidly cool the hot bottle.

Combination of the above-described two technical features enables one to markedly effectively cool the bottle.

To describe this in more detail, the blow nozzle to be used in this invention allows most of the introduced blow air to rapidly proceed downward to the bottom of the bottle due to the specific structure thereof, as has been described hereinbefore. When the blow air reaches the bottom of the bottle, the parison, in a softened state, is instantly shaped to the form of the metal mold and, at this point, after shaping of the bottle, part of the wall of the parison in the vicinity of, or above, the nozzle-pierced portion is thinned and broken to form an opening, thus the blow air circulating inside of the bottle effectively cools it. The blow air filling the metal mold is discharged through the formed opening to ensure subsequent circulation of blow air.

Thinning of part of the parison wall is conducted by forming in a corresponding portion an opening communicating with outside of the metal mold, and pressing the softened parison against the opening by the pressure of blow air to form a thin concavity. The thinned portion is broken by further introducing blow air.

Alternatively, the above-described opening may be formed by piercing the wall of said parison with a needle-like member from outside. The needle-like member has a tip portion of injection needle form which may be hollow or solid. That is, as to a hollow needle-like member, it suffices to pierce the parison wall with it because blow air is discharged through the hollow portion and, as to a solid needle-like member, an opening for discharging the blow air is formed by piercing the wall of a parison with the needle and rapidly drawing it out.

In blow molding bottles, the pinch-off portion at the bottom is formed in a thickness slightly thicker than other portions. If the bottom portion is not sufficiently cooled, there result moldings with deteriorated dimensional accuracy.

According to the present invention, however, the pinch-off portion having a greater thickness is extremely effectively cooled and there result bottles with excellent dimensional accuracy in a short time, because a large amount of blow air is introduced in the direction toward the bottom, i.e., opposite to the bottle neck, through the blow nozzle, and the blow air curculates inside the bottle and is then discharged through an opening formed in part of the parison by the pressure of the blow air.

As has been described hereinbefore, the blow nozzle used in the present invention must be so constructed as to allow the blow air to be introduced into a parison in at least the direction toward the bottom, i.e., opposite to the bottle neck.

That is, the blow nozzle to be used in the blow molding method of the present invention must have a blowing inlet or inlets facing the bottom. The nozzle may have one blowing inlet facing the bottom, or may have additional inlets facing any direction. In forming a plurality of blowing inlets, they must be constituted so that blow air can be introduced in more amount through the blowing inlet facing the bottom than that through other inlets.

Specifically, the amount of blow air introduced in the direction toward the bottom is more than 30%, preferably more than 50%, and more preferably more than 70%, of the whole blow air.

In the present invention, "direction toward the bottom" means not only the direction right under or above the nozzle but obliquely downward or upward directions in which the blow air is introduced against the inside of the bottle body.

In the conventional blow molding method, blow air is introduced through the upper portion of a parison (in the case of holding the parison with its bottom directed downward) using a blow nozzle as shown in FIG. 1, and hence most of the blow air is once blown against the wall opposite to the blowing inlet, then circulates in both downward and upward directions. However, since the amount of the blow air in the downward direction is the same as that in the upward direction, blow air not having circulated the inside of the bottle will be discharged together with blow air having circulated the inside if an opening is formed by breaking the upper part of the parison by the pressure of blow air, thus the amount of blow air circulating downward becoming extremely small.

Figure 3:
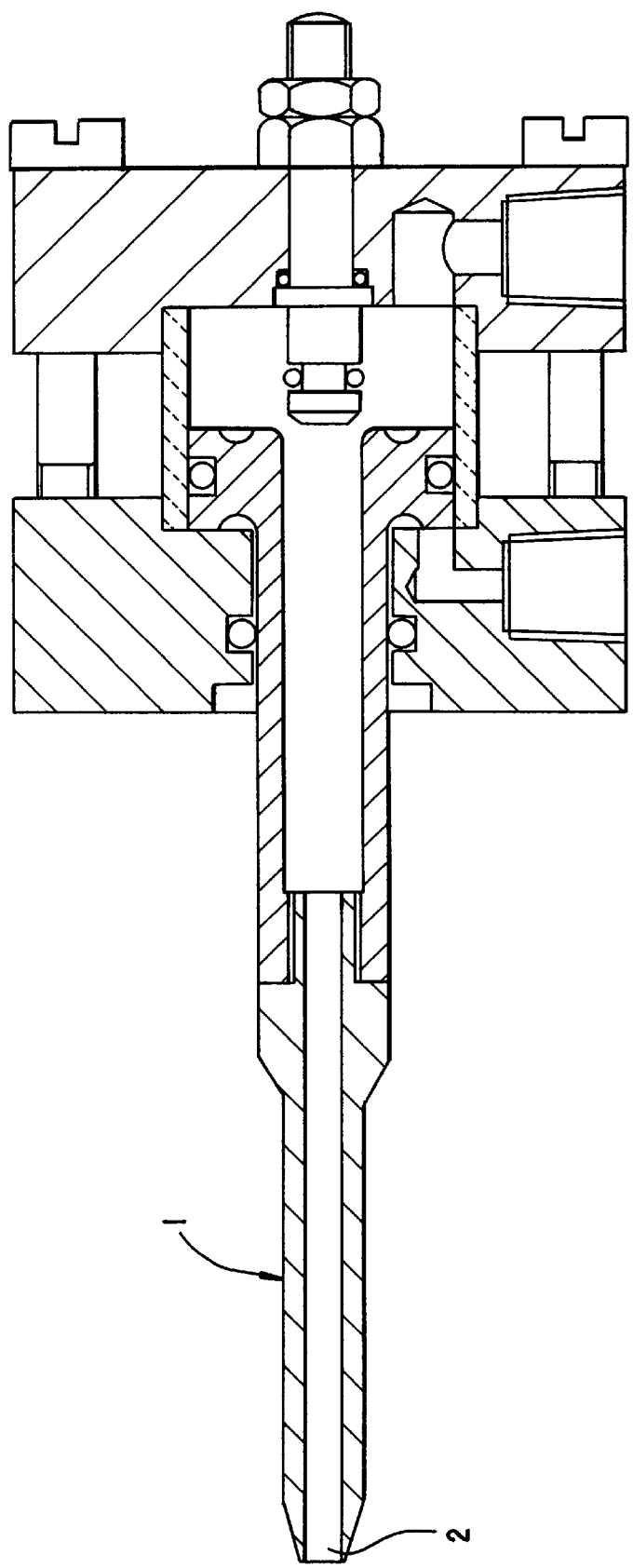
FIG. 3 is a cross-sectional side view of a blow nozzle used in the prior art blow molding method.

In addition to the blow nozzle shown in FIG. 3, there have also been known those nozzles in which blowing inlets are formed on the way to the tip portion in two directions at a right angle with a blow air passageway, as disclosed in the foregoing Japanese Unexamined Utility Model Publication No. S57-169510. In this type of nozzle, too, blow air is introduced into a parison merely in the upward and downward directions, and it has not been disclosed that, as in the present invention, a large amount of blow air is introduced into a shaped bottle at least in the direction toward the bottom to thereby instantly cool the lower part of the bottle.

Figure 4:
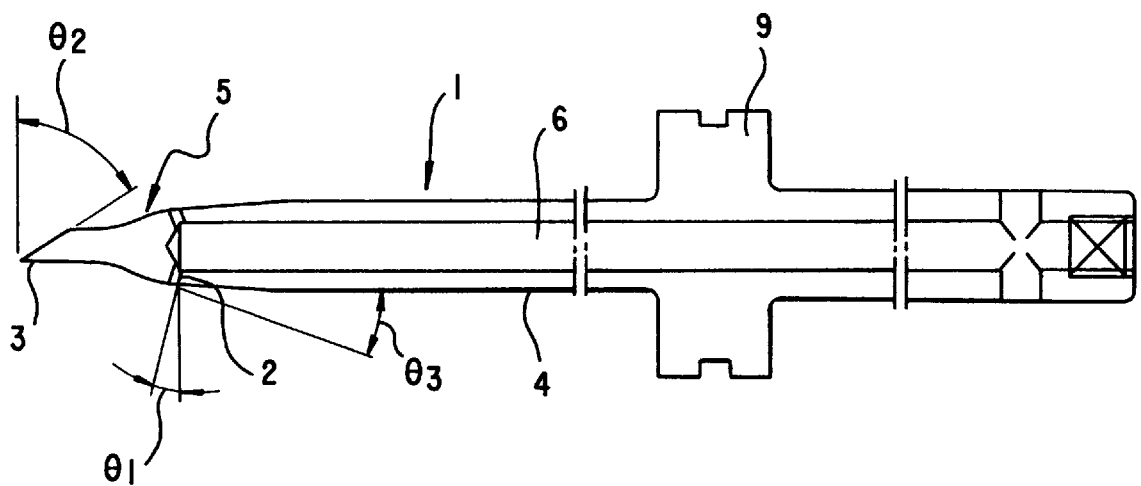
FIG. 4 is a cross-sectional side view of a blow nozzle used in the blow molding method of the present invention.
Figure 5:
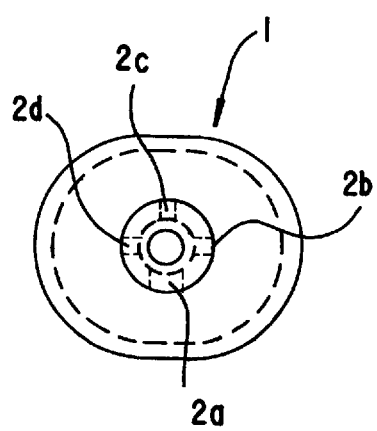
FIG. 5 is a cross-sectional front view showing one embodiment of the blow nozzle to be used for the blow molding method of the present invention.

On the other hand, in the present invention, a blow of a specific structure, as shown in FIG. 4 or 5, is used. When a blowing inlet or inlets of this nozzle are located at a position above about the center of the parison and blow air is introduced in a right downward direction (in the case of holding the parison with its bottom directed downward), the blow air uniformly circulates along the inside surface of the bottle wall after reaching the bottom and, when blow air is introduced in an obliquely downward direction, it travels downward along the opposite inside surface of the bottle wall while cooling the surface and, after reaching the bottom, travels upward along the other inside surface. Thus, the blow air circulates inside the bottle to effectively cool the molding.

A blow nozzle generally designated by numeral 1 in FIGS. 4 and 5, which is one embodiment of the present invention, has a first feature that, though front cross-section of the blowing inlets is almost circular, piston 9 sliding inside the body of the blow cylinder is of the form substantially of an ellipse in front cross-section with the major axis being in a horizontal direction. This elliptical portion functions to register the nozzle so that at least one of the blowing inlets 2 is always positioned downward. In this embodiment, four blowing inlets 2 are formed at the slight rear position 5 of the tip 3 of blow nozzle 1 in horizontal and vertical four directions substantially at a right angle with each other. The passageway of the blow nozzle 1 in the rear of the blowing inlets 2 forms a hollow portion 6, through which blow air is introduced and which also functions as a passageway for discharging blow air after completion of the molding.

The blow nozzle 1 shown in FIG. 5 has four blowing inlets capable of blowing air in the upward, downward, leftward and rightward directions, respectively. Of the four blowing inlets, blowing inlet 2a capable of blowing air in the downward direction has a larger cross-section than that of other blowing inlets 2b, 2c and 2d and allows air to be blown therethrough in an amount of at least 30%, preferably at least 50%, more preferably at least 70%, of the whole blow air amount. The blowing angle ($\theta_1$) of the blowing inlet 2a is designed to be 10 to 20 degrees, preferably 13 to 17 degrees, particularly preferably about 15 degrees, which ensures effective circulation of the blown air inside the bottle.

The angle ($\theta_2$) of the tip of nozzle is preferably 55 to 65 degrees, with about 60 degrees being most preferable. Further, the slope angle ($\theta_3$) of from the thin-diameter portion of the nozzle tip to the blowing inlets 2 is preferably 15 to 25 degrees, with about 20 degrees being most preferred.

Therefore, it suffices to form blowing inlets 2 in the blow nozzle 1 at a position slightly at the rear of the tip 3, at which the diameter is larger than that of the tip 3 and smaller than the outer diameter of the central portion 4, and at which the blowing inlets 2 can blow air at the above-described direction so as to effectively circulate downward.

That is, in the present invention, the aforementioned blow nozzle 1 with a specific form pierces the upper wall of a parison, and blowing inlets 2 are located at about the center of the parison, thus a large amount of blow air being blown through the blow nozzle 1 against the inside wall of the bottle or in the right downward direction. When this blow air is introduced into the bottle, the parison in a softened state is instantly shaped into a bottle in conformity with the form of the metal mold and, at the point, the blow air migrates upward within the bottle to thin and break part of the bottle in the vicinity of, or above, the nozzle-pierced portion 7 shown in FIG. 2 and form an opening 8, through which part of the blow air is discharged out of the bottle. In addition, the opening 8 serves for the blow air to uniformly circulate in a short time, thus the inside wall of the bottle being rapidly cooled.

However, this discharge opening is not designed to discharge the whole blow air introduced through the blow nozzle 1 but to discharge only part of the blow air, and most of the air within the bottle is discharged through the hole formed, after completion of the blowing, by rapidly moving backward the blow nozzle 1, then through a discharge outlet 13 formed in the vicinity of further backward moved blow nozzle and communicating to the outside of the body. That is, a large hole formed in the wall by the backward movement of the blow nozzle 1 functions as a discharge outlet for the inside air, and hence inside pressure of the bottle is instantly reduced to the atmospheric pressure.

Therefore, a blow nozzle having a large diameter can form a large-diameter discharge outlet, which serves to shorten the time necessary for discharging the inside air.

Structure of a blow air cylinder in accordance with the present invention is described below.

As is shown in FIGS. 6 to 10, the blow air cylinder of the present invention is constituted by a blow nozzle 1 which can freely slide forward and backward in the body 11, which has a mechanism for positioning blowing inlets at least at part of the nozzle, which has a closed tip portion 3 having a diameter smaller than the outer diameter of the central portion 4, and which has blowing inlets 2 at the slight rear of the tip portion 3 and at a position having a diameter larger than that of the tip portion 3 and smaller than the outer diameter of the central portion 4, said blowing inlets 2 enabling one to introduce blow air in the downward direction in an amount of at least 30% of the whole blow air amount; and a body 11 disposed outside said blow nozzle 1 in a state of being at least partly in contact with the nozzle.

In the wall in the vicinity of the tip of the body 11 is formed a discharge outlet 13 through which the blow air filling the metal mole is effectively discharged upon the blow nozzle 1 being moved backward. In the outer wall of the body 11 are formed a blow air-feeding inlet 11a for moving forward the blow nozzle and a blow air-feeding inlet 12a for moving backward the nozzle. The blow nozzle 1 having a piston 9 being freely moved forward and backward by the pressure of blow air is provided inside the body 11.

At least part of the blow nozzle 1 has an appropriate elliptical cross-section with the major axis being horizontal. In FIG. 5, piston 9 has such structure. That is, the blow nozzle 1 does not have a circular cross-section over the full length, but at least part of the nozzle 1 has an approprite elliptical cross-section with the major axis being horizontal, and hence the blow nozzle 1 is prohibited to rotate and, therefore, blowing inlets 2 of the nozzle can be directed always in definite directions, thus functioning as a mechanism for positioning the blow nozzle 1.

Figure 6:
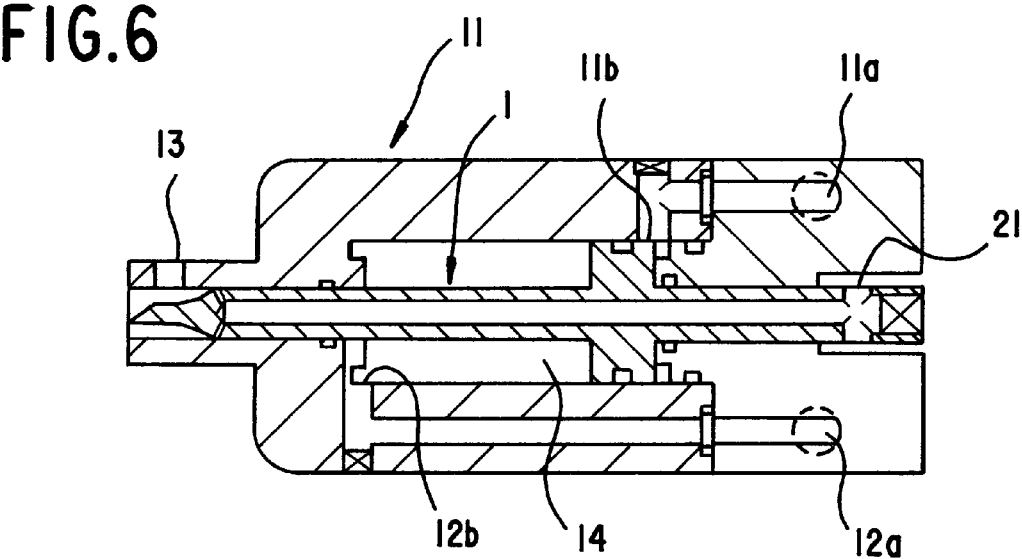
FIG. 6 is a cross-sectional view of the blow air cylinder of the present invention before work.

The operation of the blow air cylinder of the present invention is described below by reference to cross-sectional views of one embodiment of the cylinder. FIG. 6 shows a blow air cylinder before work, FIG. 7 the blow air cylinder in a state wherein introduction of blow air for moving forward a blow nozzle is initiated, FIG. 8 the blow air cylinder in a state wherein the blow nozzle has been moved forward by the pressure of blow air, FIG. 9 the blow air cylinder in a state wherein introduction of blow air for moving backward the blow nozzle, and FIG. 10 the blow air cylinder in a state wherein the blow nozzle has been restored to its original position by the pressure of air.

In FIGS. 6 through 10, air flow is shown by dotted band. Numeral 11 designates a body, and 1 a blow nozzle having a structure capable of being moved backward and forward inside the blow air cylinder and having a piston.

In the outer wall of the body 11 are formed air-feeding inlet 11a for moving foreward the blow nozzle and air-feeding inlet 12a for moving backward the blow nozzle after completion of the blow-molding. The air-feeding inlet 11a is connected to the inside of the body 11 at a portion 11b slightly at the slight rear of the center of the body 11, whereas the air-feeding inlet 12a is connected to the inside of the cylinder at a top portion 12b of the hollow portion 14 of the body.

Figure 7:
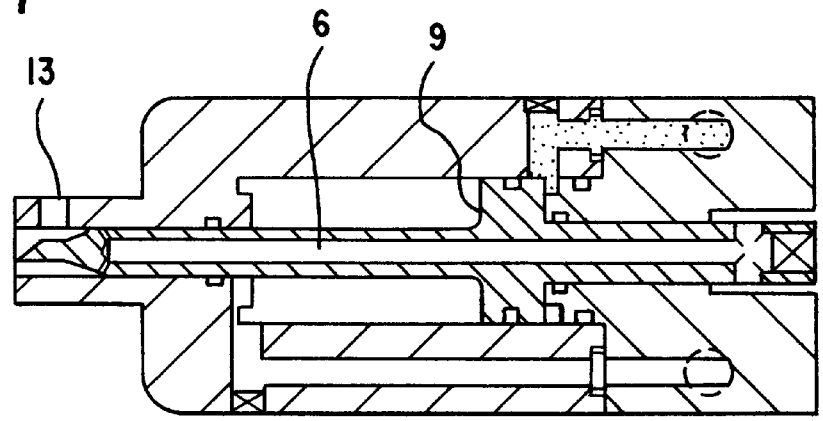
FIG. 7 is a cross-sectional view of the blow air cylinder of the present invention in the state of initiating introduction of a blow air for moving forward the blow nozzle of the blow air cylinder.
Figure 8:
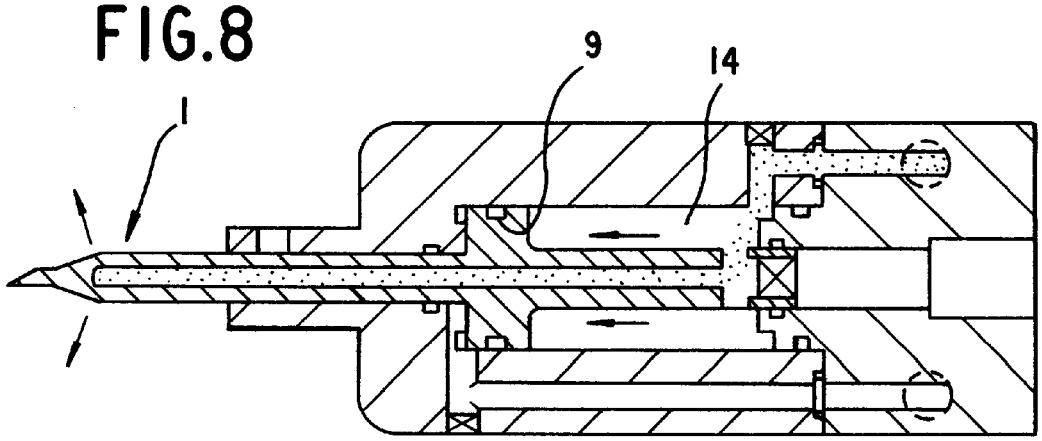
FIG. 8 is a cross-sectional view of the blow air cylinder of the present invention in the state of the blow nozzle being moved forward by the pressure of the blow air introduced thereinto.

In FIG. 7, the air blown through the air-feeding inlet 11a presses piston 9 capable of being moved forward and backward in contact with the inside wall of the body 11 to thereby move forward the blow nozzle. At the point when the piston 9 reaches the top end of the hollow portion of the body 11, blow air-feeding inlet 21 formed at about the end of the nozzle 2 is laid bare in the hollow portion of the body 11, and the subsequently introduced blow air travels through the blow air-feeding inlet 21, hollow portion 6, and the air-blowing inlets 2a, 2b, . . . formed at a slight rear of the tip portion 3 of the blow nozzle, finally into the inside of the blow molding (See FIG. 5).

Figure 9:
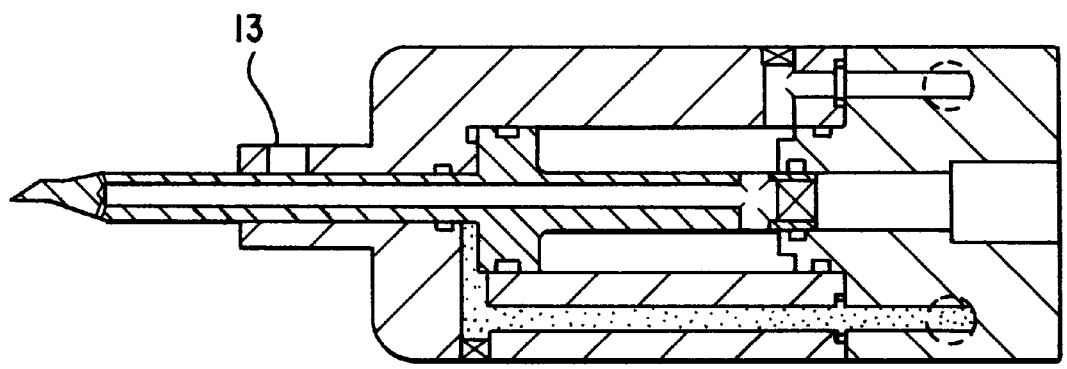
FIG. 9 is a cross-sectional view of the blow air cylinder of the present invention in the state of initiating introduction of a blow air for moving backward the blow nozzle.
Figure 10:
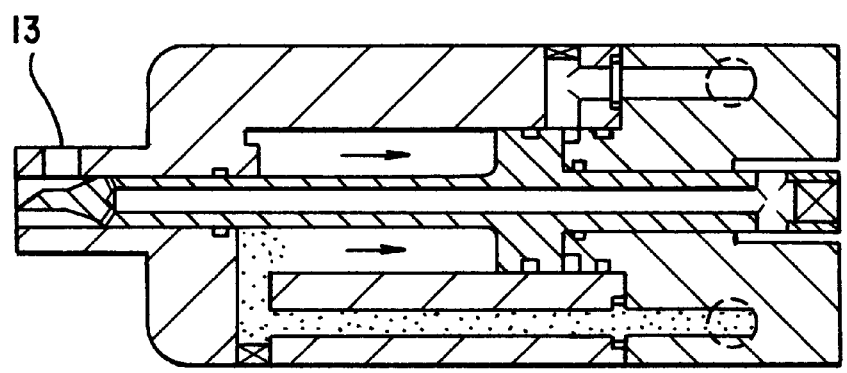
FIG. 10 is a cross-sectional view of the blow air cylinder of the present invention in the state of being restored to the initial position by the pressure of the air.

Upon completion of the blowing, an automatic changing apparatus (not shown) provided in the air-feeding equipment is actuated, and now introduction of air through the air-feeding inlet 12a is initiated as shown in FIG. 9. At this point, air-feeding inlet 12b is in the state of connecting to the space enclosed with the piston 9, the blow nozzle 1 and the body 11, and the air fed through the air-feeding inlet 12a is introduced into the inside of the body 11 through the air-feeding inlet 12b, thus the piston 9 is pressed in the backward direction until the blow nozzle 1 is restored to its original position (FIG. 10).

Upon the blow nozzle being moved backward to leave the parison, the blow air filling the cavity of the metal mold is vigorously discharged through the largish hole in the wall of the parison having been formed by the blow nozzle 1, then through a discharging hole 13 formed in the wall of the body 11 at a position in the vicinity of the top of the body 11.

Part of the blow air can also be discharged through the blowing inlets 2a, 2b, . . . formed in the blow nozle 1. This air migrates backward through the hollow portion 6 of the blow nozzle as well as through the aforesaid discharge outlet 13.

In the blow molding method of the present invention, the use of such specific blow nozzle enables one to instantly blow a large amount of blow air having been fed through the air-blowing inlet in the downward direction and, after completion of the molding, instantly discharge outside the blow air filling the cavity of the metal mold.

According to the present invention, blow air can be effectively circulated in the bottle and, since the hole formed after the blow nozzle is moved backward and the discharge outlet 13 formed in the wall of the body in the vicinity of the tip of the body function as discharge holes to instantly discharge a large amount of blow air out of the body, the blow molding cycle is markedly shortened. This advantage can be obtained only by the combination of formation of an opening in the vicinity of, or above, the blow nozzle-pierced portion of a parison by thinning and breaking the portion by the blow air or by piercing with a needle-like member and the blow air cylinder having the above-described specific structure.

EXAMPLE

Advantages of the present invention are now described in more detail by reference to the following example.

Additionally, conditions under which the average temperature in a thicknesswise direction becomes 108° C. when blow molding conditions of 26° C. in blow air temperature, 15° C. in the surface temperature of the metal mold, and 13 seconds in cooling time are employed as in the conventional blow molding are taken as standard conditions.

Experiments of molding the same shaped moldings were conducted using the same materials and changing part of the blowing conditions to determine conditions for cooling the moldings to the average temperature of 108° C. in the thickness-wise direction.

The blow nozzle used in the experiments of the present invention described in (3) and (4) below has four blowing inlets facing upward, downward, leftward and rightward, respectively, with the blowing inlet facing downward having a diameter of 3.5 φ and the blowing inlets facing upward, leftward and rightward having a diameter of 1.5 φ, and a passageway having a diameter of 5 φ and a cross-sectional area of 19.6 mm$^2$, with the inlets having an angle of 15 degrees. This blow nozzle is so constituted as to blow 64% of blow air based on the whole blow air through the inlet facing downward.

(1) When blow molding was conducted under the conditions of 26° C. in blow air temperature and 5° C. in the surface temperature of the metal mold, the average temperature became 108° C. in 12.5 seconds. Therefore, the molding cycle was shortened by 5% by changing the surface temperature of the metal mold from 15° C. to 5° C.

(2) When blow molding was conducted under the conditions of 0° C. in blow air temperature and 15° C. in the surface temperature of the metal mold, the average temperature became 108° C. in 12.7 seconds. Therefore, the molding cycle was shortened by 3% by changing the blow air temperature from 26° C. to 0° C.

Figure 2:
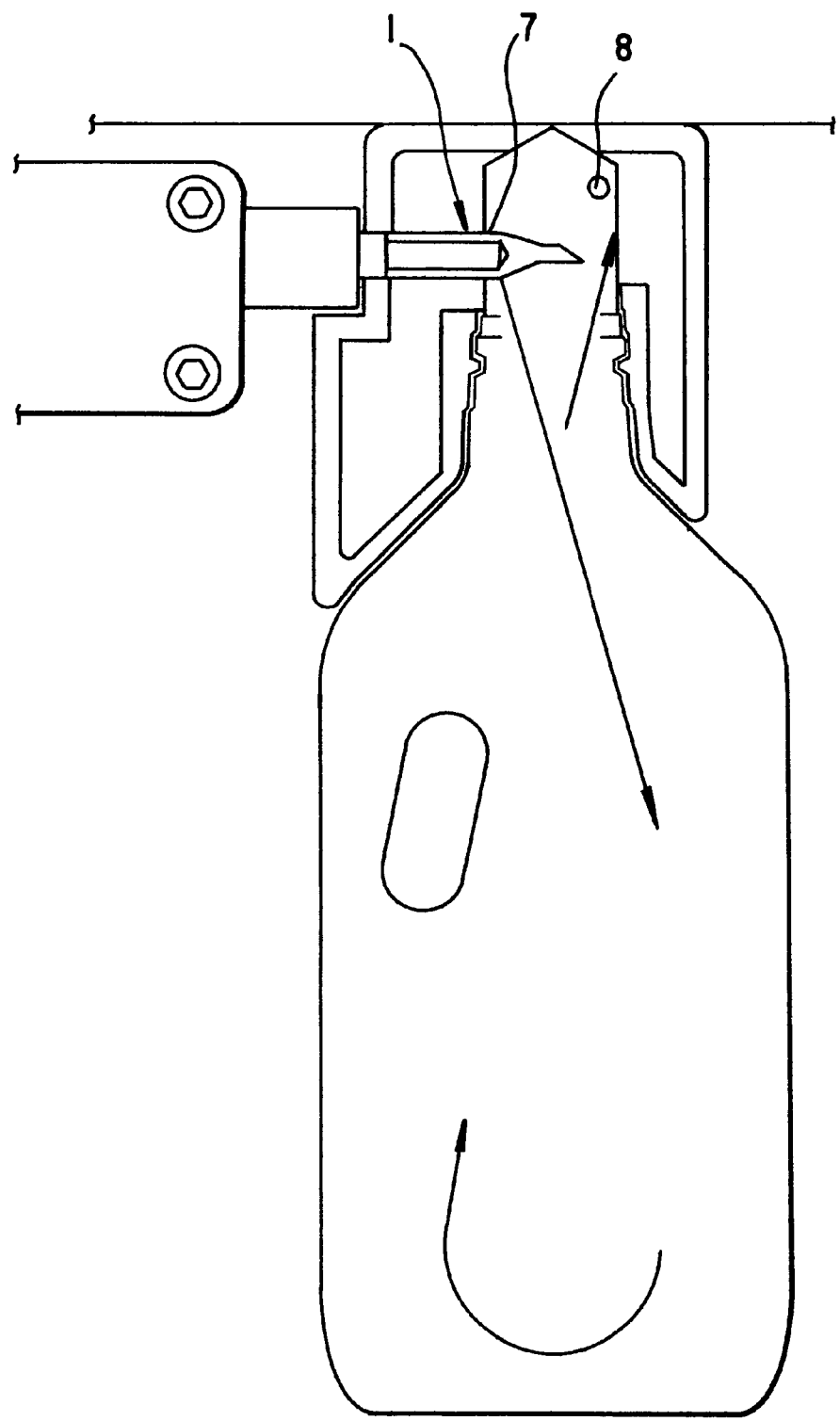
FIG. 2 is a schematic view illustrating the state of a blow nozzle used in the blow molding method of the present invention.

(3) When blow molding was conducted under the conditions of 26° C. in blow air temperature and 15° C. in the surface temperature of the metal mold using the blow air cylinder of the present invention and piercing the parison with the blow nozzle as shown in FIG. 2, the average temperature became 108° C. in 10.5 seconds. Therefore, the molding cycle was shortened by 25% in this case.

(4) When the nozzle was moved backward immediately after blowing the blow air for about 9 seconds to form a hole in the blow molding (3), said hole functioning as a discharge hole for discharging the air inside the bottle, the average temperature became 108° C. in 9.4 seconds. Therefore, the molding cycle was shortened by 40% in this case.

Additionally, in the above-described (1), it requires to feed a cooling water of 0° C. or lower than that in order to keep the surface temperature of the metal mold at 5° C., which is industrially difficult and involves the problem of dropwise condensation on the surface of metal mold, thus being impossible to practice. In the above-described (2), it is industrially difficult to feed blow air of 0° C. In addition, both (1) and (2) scarcely contribute to shortening of the blow-molding time. Thus, it can be seen that such blow molding conditions cannot be practically employed.

As can be seen from the above-described results on the experiments, blow molding cycle can be markedly shortened by instantly introducing blown air particularly in the downward direction to rapidly circulate throughout inside the molding and by rapidly discharge the blow air introduced in a pressed state.

Therefore, the structure of the nozzle realizing the effective circulation of the blow air inside the molding has a great significance.

Industrial Utility

As has been described in detail, according to the present invention, a blow air cylinder of a specific structure is employed, an opening is formed above the blow nozzle-pierced portion by the pressure of blow air or by piercing with a needle-like member from outside, and an upper portion of the parison is pierced with said blow nozzle to locate it at about the center of the parison, thus effective circulation of the blow air being conducted on the inside surface of the molding. In addition, a hole formed after the blow nozzle being moved backward and a discharge hole in the vicinity of the tip of the body function as air-discharging outlets, which serve to instantly discharge the pressed air inside the molding. As a result, cooling time for the blow molding products is markedly shortened, which serves to shorten molding cycle and improve quality of the product such as dimensional accuracy, uniformity of thickness, etc.

What is claimed is:

1. A blow air cylinder comprising, in combination;

a housing having a hollow interior and a guiding opening, a blow nozzle having a generally tubular body which is slidably movable through said guiding opening of said housing forwardly and backwardly inside a molded body to be cooled, said molded body having one end intended to form a bottle neck and another end intended to form a bottom, said tubular body of said blow nozzle having a tip portion including a solid sharp tip for penetrating a wall of said molded body, a plurality of blowing inlets for emitting air therefrom being located at spaced locations about a circumference of said tubular body at a back side of said tip portion in a region of said tubular body having an outer diameter which is larger than that at said tip portion, said plurality of blowing inlets being sized to supply a larger amount of blow air, in an amount of at least 30% of the total blow air amount, away from said neck end and toward said bottom of said molded body, and means on said tubular body of said blow nozzle cooperating with said guiding opening of said housing for positioning said blow inlets with the inside of said molded body.

2. The blow air cylinder as described in claim 1, further comprising a discharge outlet for discharging blow air in the wall of the housing in the vicinity of the tip of the body.

3. The blow air cylinder as described in claim 1, further comprising an air-feeding inlet in the housing for permitting air to be introduced when the blow nozzle moves forward and for introducing blow air into the mold, and another air-feeding inlet in the housing for receiving air from the blow nozzle when it moves backward.

4. The blow air cylinder as described in claim 1, wherein said positioning mechanism comprises at least part of the tubular body of the blow nozzle [in] having an elliptical form in cross section, with a horizontal axis of the elliptical form being the major axis.

5. The blow air cylinder as described in claim 1, wherein the amount of blow air introduced in the direction toward the bottom of said molded body which is opposite to the bottle neck, is greater than that introduced in other directions.

* * * * *